United States Patent [19]

Felter et al.

[11] Patent Number: 4,605,570

[45] Date of Patent: Aug. 12, 1986

[54] EPOXY-PHOSPHATE CERAMIC COMPOSITIONS AND METHODS OF PREPARATION

[75] Inventors: Richard E. Felter, East Hempfield Township, Lancaster County; Dean A. Markley, Mountville, both of Pa.

[73] Assignee: Armstrong World Industries, Inc., Lancaster, Pa.

[21] Appl. No.: 763,999

[22] Filed: Aug. 9, 1985

[51] Int. Cl.[4] .......................... C08K 3/34; C08K 3/32; B05D 3/02
[52] U.S. Cl. ..................................... 427/386; 523/451
[58] Field of Search .................. 523/451; 427/386; 524/443

[56] References Cited

U.S. PATENT DOCUMENTS 4,375,516  3/1983  Barrall ................................. 501/84
4,548,959  10/1985  Nagai et al. ........................ 523/451

Primary Examiner—Lewis T. Jacobs
Attorney, Agent, or Firm—Laird F. Miller

[57] ABSTRACT

The present invention relates to novel compositions comprising epoxy resins and phosphate ceramic compositions derived from wollastonite, a metal oxide, and phosphoric acid. In addition to providing a curing component for the inorganic constituents of the composition, the phosphoric acid also serves as an acid catalyst for the epoxy resin. As a result, a system is obtained which can be highly filled with inert material, yet which provides superior resistance to traffic and other wear conditions. In one preferred embodiment, the above composition comprises latent curing additives which provide an accelerated cure to the system.

36 Claims, No Drawings

EPOXY-PHOSPHATE CERAMIC COMPOSITIONS AND METHODS OF PREPARATION

The present invention relates to coating compositions, and in particular to epoxy coating compositions.

BACKGROUND OF THE INVENTION

Surface coverings in an industrial environment are exposed to a variety of stresses caused by foot traffic, vehicles and other objects which are moved across the surfaces. As a result, such surfaces experience gouging, scratching, scraping and other stresses which result in a deterioration of the ability of the floor to perform in a satisfactory manner. Concrete has long been known to be an unsatisfactory material because, under such stresses, it has demonstrated spalling and other properties which have precluded use in an industrial environment.

In order to overcome these difficulties, floor toppings, coatings, sealers and the like (collectively referred to herein as "coatings" or "coating systems") have been developed comprising epoxy and other resinous materials. These coating systems have been utilized to provide tough, durable surfaces which are capable of withstanding severe stresses even under extremely adverse conditions. Nevertheless, these systems have drawbacks in that they are expensive and are relatively slow-curing when installed during refurbishing operations. In addition, many epoxy coatings comprise basic curing components which are less favored for use in environments where pharmaceuticals and foods are processed because special handling of the coatings is required.

Accordingly, one objective of the present invention is to provide novel epoxy coating systems which comprise inorganic components that replace at least a portion of the epoxy components as found in conventional systems.

Another objective of the present invention is to provide rapid-curing epoxy systems which have improved performance characteristics.

Yet another objective of the present invention is to provide a modified epoxy system comprising an interpenetrating network of inorganic material which stabilizes the thermal expansion characteristics of the resulting system so as to make said system more amenable to use as a concrete coating material.

These and other objectives of the present invention will become apparent from the detailed description of preferred embodiments which follow.

SUMMARY OF THE INVENTION

The present invention relates to novel compositions comprising epoxy resins and phosphate ceramic compositions derived from wollastonite, a metal oxide, and phosphoric acid. In addition to providing a curing component for the inorganic constituents of the composition, the phosphoric acid also serves as an acid catalyst for the epoxy resin. As a result, a system is obtained which can be highly filled with inert material, yet which provides superior resistance to traffic and other wear conditions. In one preferred embodiment, the above composition comprises latent curing additives which provide an accelerated cure to the system.

DETAILED DESCRIPTION OF PREFERRED EMBODIMENTS

In one embodiment, the present invention relates to a curable material comprising an epoxy resin and a composition which is suitable to provide a rigid, water-resistant phosphate ceramic material, said composition comprising phosphoric acid, a metal oxide and calcium silicate.

In a second embodiment, the present invention relates to a process for preparing a curable composition, said process comprising the steps of selecting an epoxy resin and components suitable to provide a rigid, water-resistant phosphate ceramic material, said components comprising phosphoric acid, a metal oxide and calcium silicate; and intermixing said resin and said components to provide a substantially uniform curable composition.

In a third embodiment, the present invention relates to a process for preparing a coated substrate, said process comprising the steps of selecting an epoxy resin and components suitable to provide a rigid, water-resistant phosphate ceramic material, said components comprising phosphoric acid, a metal oxide and calcium silicate; intermixing said resin and said components to provide a substantially uniform coating composition; disposing said composition on a substrate to be coated; permitting said composition to self-cure on said substrate; and optionally, applying a post-cure heat treatment to completely cure the resulting coating system.

Thermosetting epoxy resins are well known in the art. A variety of such resins are available and include epoxidized novolac resins, liquid cycloaliphatic resins, and resins derived from the reaction of epichlorohydrin and a polyhydroxy compound, the latter types of resins being the most widely used. Of this latter group, the reaction products of epichlorohydrin and bisphenol A, commonly referred to as the diglycidyl ethers of bisphenol A, are the most common.

In conventional usage, such resins are curable by the use of acidic or basic cross-linking agents, or through the use of catalysts. The cross-linking agents typically have comprised primary and secondary aliphatic polyamines or acidic materials such as acid anhydrides and polybasic acids. The catalysts do not serve as direct cross-linking agents, but permit the epoxy portions of the resin to co-react. As explained in more detail below, the present invention employs an acidic curing process.

Epoxy resins are available as materials which range from low-viscosity liquids to high-melting solids. In order to obtain the most complete interpenetrating system according to the present invention, it is necessary for the epoxy material to be in a fluid form as curing occurs. This may be achieved through the use of liquid epoxies or low-melting epoxies which will be liquid under the conditions of cure, or by including components such as diluents which will encourage dissolution of the epoxy materials, including those which are high-melting. It is understood, however, that products having varying properties may be produced according to the present invention using solid epoxies without also including materials to aid in dissolution. Diluents are discussed in more detail below.

The phosphate compositions which may be used to practice the present invention are those which comprise at least one metal oxide, calcium silicate (wollastonite), and phosphoric acid. Examples of such compositions are found in U.S. Pat. No. 4,375,516, which is owned by the assignee of the present invention. Both foamable and non-foamable compositions may be utilized to practice the present invention although, in most situations, non-foamable compositions will be preferred. In addition, it will be understood that phosphate compositions other than those disclosed in the aforementioned U.S. Patent may also be used to practice the present invention, and that the present invention is not restricted to those compositions which are presently explicitly described in the art. Thus, metal oxides other than aluminum oxide, magnesium oxide, calcium oxide and zinc oxide will find utility in practicing the present invention.

The ratio of epoxy to phosphate composition may vary from about 5 to about 95 parts by weight of epoxy to from about 95 to about 5 parts by weight of phosphate composition, based on 100 total parts of epoxy and phosphate composition. Preferably, however, from about 50 to about 95 parts of epoxy will be employed with from about 50 to about 5 parts of phosphate composition.

To practice the present invention, it is convenient to prepare a first mixture comprising the epoxy resin and, optionally, a filler such as sand or other material. A second composition is also prepared comprising the wollastonite, the phosphoric acid, and the metal oxide. If a non-foamed product is desired, the latter composition is stirred briefly to ensure that unwanted foaming reactions (usually caused by carbonate impurities) are complete, and the two compositions are then combined. Often a viscous paste-like material is obtained which can be applied by troweling or other means to a substrate which is to be coated. Under normal circumstances, the mixing process requires from about 1 to 5 minutes; and initial setting (accompanied by self-generated heat) may be varied to occur in from about 5 minutes to about 40 minutes. Typically, the resulting surfaces are cured to a hard set approximately 1 to 4 hours after mixing.

When practicing the present invention, it has been noted that the phosphoric acid in the system serves not only as a reactant with the inorganic materials, but also as a crosslinking agent for the epoxy resin. Thus, the two systems are interpenetrating in that overlapping matrices of organic and inorganic materials are produced.

When selecting the materials to practice the invention, it is usually desirable to select calcium silicate and metal oxides which are of relatively large particle size; i.e., on the order of about 10-30 microns. Finer particle size materials can be used, but more rapid reactions are obtained and greater care is required to accomplish the steps of mixing and casting the materials on the surface to be coated prior to the time that the curing reaction is initiated.

Although the most simple system which may be used to practice the present invention comprises only the phosphate composition and the epoxy resin, it has been noted that, as the phosphoric acid in the system is utilized by reaction with the inorganic materials, the curing of the epoxy components slows down. In order to facilitate the complete cure of both the organic and the inorganic components, it is desirable to add acidic materials which will permit the curing of the epoxy resin to continue. The most desirable materials are Lewis acids, examples of which are: A. Organometallic compounds of metals of Group IIIA of the periodic table, represented by the formula $R_aMX_b$ in which M is a metal from Group IIIA, e.g. aluminum, having a valence of $a+b$; X is anionic, e.g. a halogen such as chlorine and R is a hydrocarbon selected from the group consisting of alkyl, aryl, cycloalkyl, alkylaryl and arylalkyl; and B. Halogen compounds of non-metallic elements such as boron, represented by the formula $AX_d$ wherein d is the valence of the non-metal and X is a halogen such as fluorine, chlorine or bromine.

Boron trifluoride is a particularly effective catalyst; however, it is a toxic gas which is quite difficult to handle. Nevertheless, this difficulty may be overcome by using masked boron trifluoride, and related masked catalysts. When using masked catalysts, the heat generated by the curing of the epoxy/phosphate system results in a decomposition of the masked catalyst to liberate free boron trifluoride. Thus, even though the phosphoric acid is being utilized during a reaction, the heat-regenerated boron trifluoride (or related compound) acts as a catalyst which permits continuation of the epoxy cure. It has been found suitable to provide from about 0.5 to about 3% by weight of the masked catalyst, based on the total weight of the composition. One masked catalyst which is especially preferred is boron trifluoride monoethylamine.

When preparing compositions of the present invention, it is often desirable to include high levels of filler so that the overall cost of the composition can be reduced. However, with increased levels of fillers, an accompanying increase in viscosity is noted such that it is often difficult to obtain adequate mixing of the components. One way in which adequate mixing may be improved is by the incorporation of reactive or nonreactive diluents in the composition. Epoxy reactive diluents crosslink with the various components in the system while at the same time reducing the viscosity of the mixture to a manageable level. Examples of such reactive diluents are cresyl glycidyl ether, butyl glycidyl ether and furfuryl alcohol, the latter being especially preferred. Nonreactive diluents such as tetrahydrofurfuryl alcohol and plasticizer-type materials which are compatible with the epoxy/phosphate composition (e.g., dibutyl phthalate) may also be used. Both types of additives assist in ensuring that the epoxies and the masked catalysts are uniformly dispersed in the epoxy/phosphate matrix; however, the reactive diluents are usually preferred because they assist in providing a stronger final product.

The fillers which may be utilized may comprise a variety of organic or inorganic materials. Although sand is one preferred filler, as previously indicated, it nevertheless is a dense material. Accordingly, where less dense coating compositions are desired, other inorganic materials such as flyash and other hollow spheres may be utilized. In addition, organic fillers such as polyvinylidine chloride and phenolic microballoons may also be utilized.

The coatings of the present invention will be useful to coat concrete and other typical industrial surface coverings. Further, they may be utilized to coat metal surfaces and exceptional bonding will be obtained to such metal surfaces because of the acidic nature of the system. Nevertheless, the system cures to a substantially neutral condition such that deterioration because of the continued presence of acid is avoided.

As yet another alternative, particulate resinous materials may be included within the compositions of the present inventions, such resinous materials including polyesters or other materials which are compatible with aqueous acid.

The present invention will be better understood with reference to the examples which follow, said examples being provided by way of illustration and not limitation.

EXAMPLES

EXAMPLE 1

This example will illustrate the reaction of an unfilled composition comprising an epoxy resin and a phosphate binder composition. A mixture was prepared comprising the following components:

| Components | Parts by Weight |
|---|---|
| Epoxy resin (Araldite No. 6010 from Ciba-Geigy) | 90.0 |
| Wollastonite blend | 4.5 |
| Prereacted acid solution | 5.3 |
| 85% Phosphoric acid (61.5% $P_2O_5$) | 5.0 |
| Water | 0.3 |

The wollastonite blend comprised 78.1 parts of Nyad 400 wollastonite, 17.4 parts of Nyad G and 4.5 parts of magnesium oxide. Nyad 400 is a particulate wollastonite having an average particle size of 6.7 microns, with 60% of the particles having a particle size of less than 10 microns. Nyad G is a medium grade fibrous wollastonite material. Nyad and Nycor wollastonite products are sold by Interpace Corporation. The magnesium oxide was added to accelerate the reaction time. The prereacted acid solution comprised 77.5 parts of phosphoric acid having a $P_2O_5$ content of 53%, 10.2 parts of aluminum oxide trihydrate, and 12.3% water.

All components except the epoxy resin were combined and stirred for about 1 minute to allow any foam generated by the presence of carbonate impurity to dissipate, and the solution was then mixed with the epoxy component. The resulting mixture was cast on concrete to give an initial set in about 25 minutes and a hard set in about 4 hours. "Hard set" as used herein refers to the approximate hardness at which strong finger pressure will no longer cause indentation of the surface.

EXAMPLE 2

This example will illustrate the preparation of a preferred coating composition comprising a filler. The following components were utilized:

| Components | Parts by Weight |
|---|---|
| Epoxy resin (Araldite No. 6005 from Ciba-Geigy) | 85.0 |
| Sand | 75.0 |
| Titanium dioxide pigment | 1.0 |
| 85% Phosphoric acid (61.5% $P_2O_5$) | 6.1 |
| Prereacted acid solution (see Example 1) | 2.1 |
| Wollastonite (Nycor 200) | 6.9 |

Nycor 200 is a course ceramic-grade wollastonite. A mixture was prepared comprising the epoxy resin, the sand and the titanium dioxide. A second composition was prepared comprising the phosphoric acid, the prereacted acid solution, and the wollastonite. The acid solution was stirred for approximately one minute as described in Example 1, and the solution was then mixed with the epoxy/filler composition. The resulting mixture was cast on a concrete pad and provided an initial set in 15 minutes and a hard-set coating material in 60 minutes at room temperature.

After aging for 24 hours, a portion of the sample was placed in tetrahydrofuran (THF) at room temperature for 4 hours to dissolve the soluble organic components. Only 25% of the organic material was extracted, suggesting that all but 25% of the organic material was crosslinked. The same aging and extraction procedure was used to obtain extraction data for other examples for which such data are provided.

EXAMPLE 3

This example will illustrate the preparation of two compositions comprising a reactive diluent. The components of each system were as follows:

| Component | Parts by Weight Sample 3A | Sample 3B |
|---|---|---|
| Epoxy resin (No. 6005) | 80.75 | 76.50 |
| Furfuryl alcohol | 4.25 | 8.50 |
| Wollastonite (Nycor 200) | 6.90 | 6.90 |
| 75% $H_3PO_4$ (53% $P_2O_5$) | 8.10 | 8.10 |
| Zircon sand | 75.00 | 75.00 |

The furfuryl alcohol was included in the initial epoxy mixture, and the overall mixture of the composition was provided in the manner set forth in Example 2. Sample 3A set in 20 minutes and provided a hard-set material in 60 minutes at room temperature whereas Sample 3B set in 21 minutes and provided a hard-set material in 50 minutes. THF extraction provided extractions of 44.3 and 41.1%, respectively, of the organic material.

EXAMPLE 4

This example will illustrate the preparation of compositions comprising a masked boron trifluoride catalyst. The compositions were prepared as described in preceding examples and had the following components.

| Component | Sample 4 (Weight %) |
|---|---|
| Epoxy resin (Araldite No. 6060) | 75.0 |
| Furfuryl alcohol resin (Durez No. 16470 from Occidental Chemical Co.) | 10.0 |
| Wollastonite (Nycor 200) | 6.9 |
| Prereacted acid solution | 2.1 |
| 85% $H_3PO_4$ (61.5% $P_2O_5$) | 6.1 |
| Boron trifluoride.aniline | 3.0 |
| Sand | 300 |

This composition gave an initial set in about 40 minutes, and a hard set in about 3 hours at room temperature. THF extraction yielded 33.6% of the organic material.

EXAMPLE 5

This example will illustrate the preparation of compositions comprising a masked boron trifluoride catalyst. The compositions were prepared for use as set forth in the preceding examples and comprised the following components.

| Component | Parts by Weight Sample 5A | Sample 5B |
|---|---|---|
| Epoxy resin (Araldite No. 6010) | 75.0 | 75.0 |
| Furfuryl alcohol resin (Durez No. 16470) | 10.0 | 10.0 |
| Polyamine/amide hardener No. | — | 15.0 |

-continued

| Component | Parts by Weight | |
|---|---|---|
| | Sample 5A | Sample 5B |
| (HY943 from Ciba-Geigy) | | |
| Wollastonite (Nycor 200) | 6.9 | — |
| Prereacted acid solution | 2.1 | — |
| 85% $H_3PO_4$ (61.5% $P_2O_5$) | 6.1 | — |
| Boron trifluoride.monoethylamine | 3.0 | 3.0 |
| Zeospheres | 100.0 | 100.0 |

Sample 5A gave an initial set in 20 minutes and a hard set in 1 hour whereas Sample 5B required 1 hour to provide an initial set and 2 hours to give a hard set. THF extraction yielded 11.8 and 11.3%, respectively, of the organic material.

Each sample was subjected to a breaking strength test essentially according to ASTM C648. The samples exhibited breaking strengths of 1120 and 1060 pounds per inch, respectively.

EXAMPLE 6

This example will illustrate the preparation of a flexible cured coating material derived from the following components.

| Component | Sample 6 (Weight %) |
|---|---|
| Epoxy resin (Araldite No. 6005) | 75.0 |
| Tetrahydrofurfuryl alcohol | 10.0 |
| Boron trifluoride.monoethylamine | 2.0 |
| Wollastonite (Nycor 200) | 6.9 |
| Prereacted acid solution | 3.5 |
| 85% $H_3PO_4$ (61.5% $P_2O_5$) | 4.7 |

The above composition was prepared as previously described and cast into a silicone mold at a thickness of approximately 0.25 inch. Approximately 1 hour was required for an initial set and 4 hours were required to yield a hard set. THF extraction removed 35.5% of the inorganic material.

The material, upon removal from the mold, was found to be quite flexible in that it could be flexed 90 degrees in either direction without breaking or cracking. A comparative example which comprised no tetrahydrofurfuryl alcohol was rigid.

EXAMPLE 7

This example will illustrate the preparation of a coating composition comprising an organic curing agent. The example was prepared in the usual manner from the following components.

| Component | Sample 7 (Weight %) |
|---|---|
| Epoxy resin (Araldite No. 6005) | 75.0 |
| Furfuryl alcohol | 10.0 |
| Salicylic acid | 4.0 |
| Wollastonite (Nycor 200) | 6.9 |
| Prereacted acid solution | 3.5 |
| 85% $H_3PO_4$ (61.5% $P_2O_5$) | 4.7 |
| Sand | 300 |

This composition exhibited a lower evolution of heat than the preceding examples. It required 30 minutes to give an initial set and approximately 2 hours to cure to a hard-set. THF extraction removed 24.5% of the organic material.

EXAMPLE 8

This example will illustrate that approximately the same time is required to provide a hard-set even though the quantity of epoxy material is reduced and the quantity of acid material is increased. The following three compositions were prepared:

| Component | Weight % | | |
|---|---|---|---|
| | Sample 8A | Sample 8B | Sample 8C |
| Epoxy resin (Araldite No. 506 from Ciba-Geigy) | 85.0 | 70.0 | 55.0 |
| Wollastonite (Nycor 200) | 6.9 | 13.8 | 20.7 |
| Prereacted acid solution | 3.5 | 7.0 | 10.5 |
| 85% $H_3PO_4$ (61.5% $P_2O_5$) | 4.7 | 9.4 | 14.1 |
| Sand | 300 | 300 | 300 |

Each composition gave a hard set in about one hour. However, THF extraction removed 36.4, 12.0 and 14.6%, respectively, of the organic material.

EXAMPLE 9

This example will illustrate the preparation of foamed products comprising epoxy and phosphate material. A composition was prepared from the following components.

| Component | Sample 9 (Weight %) |
|---|---|
| Epoxy resin (ERL-4299 from Union Carbide) | 25.0 |
| Modified acid | 13.6 |
| Wollastonite blend (see Example 1) | 11.4 |

Of the above components, the epoxy resin is a very reactive cycloaliphatic epoxy resin which reacts quickly and with a high degree of exotherm when exposed to the phosphoric acid composition of the present invention. The modified acid comprised 75% $H_3PO_4$ having a $P_2O_5$ content of 53%. Each 100 parts of acid also comprised 8 parts of aluminum oxide trihydrate. The resulting product foamed when mixed and provided a cured epoxy foamed material.

EXAMPLE 10

This example will illustrate another foamed epoxy product comprising polyvinylidine chloride microspheres filled with a low-boiling hydrocarbon liquid. The microspheres are sold as Microlite 126 by Pierce and Stephens Chemical Corporation. A mixture was prepared in the usual manner from the following components.

| Component | Sample 10 (Weight %) |
|---|---|
| Epoxy resin (Araldite No. 6010) | 75.0 |
| Furfuryl alcohol resin (Durez 16470) | 10.0 |
| Boron trifluoride.monoethylamine | 3.0 |
| Wollastonite (Nycor 200) | 6.9 |
| Prereacted acid solution | 3.5 |
| 85% $H_3PO_4$ (61.5% $P_2O_5$) | 4.7 |
| Microlite 126 spheres | 2.0 |

The resulting mixture hardened in 60 minutes. When subjected to a subsequent heat treatment at 150° C. for five minutes, the cured composition expanded to twice its original volume and the density changed from 1.26 grams per cc to 0.50 grams per cc.

EXAMPLE 11

This example will illustrate that the addition of diluents to epoxy materials will reduce the viscosity so as to assist in the addition of filler materials. Compositions were prepared as follows using Araldite No. 6005 epoxy resin. For those samples in which a diluent was included, 12% by weight of diluent was added.

| Sample | Diluent | Viscosity (cp) |
| --- | --- | --- |
| 11A | — | 8500 |
| 11B | Furfuryl alcohol resin (Durez No. 16470) | 4000 |
| 11C | Furfuryl alcohol | 900 |
| 11D | Tetrahydrofurfuryl alcohol | 1220 |

These results indicate that the inclusion of a relatively small amount of diluent caused a remarkably large reduction in viscosity.

EXAMPLE 12

This example will illustrate the use of a solid epoxy resin at various levels. Compositions were prepared comprising the following components:

| Component | Sample (Parts by Weight) | | | |
| --- | --- | --- | --- | --- |
| | 12A | 12B | 12C | 12D |
| Prereacted acid | 35.1 | 37.8 | 40.5 | 43.2 |
| Wollastonite | 29.9 | 32.2 | 34.5 | 36.8 |
| Sand | 20.0 | 20.0 | 20.0 | 20.0 |
| Epoxy resin (Araldite No. 7013 from Ciba-Geigy) | 15.0 | 10.0 | 5.0 | — |

The epoxy resin was used in powdered form and was combined in the usual manner with the other components. The mixture was placed in a silicone mold at a thickness of about ¼ inch and each sample was heated at 150° C. for 3 minutes. The resulting products were hard and rigid. Breaking strength tests essentially according to ASTM C648 gave the following results:

| Sample | Breaking Strength (lbs. per inch) |
| --- | --- |
| 12A | 336 |
| 12B | 341 |
| 12C | 323 |
| 12D | 269 |

EXAMPLE 13

This example will illustrate that products of the present invention demonstrate reduced thermal expansion relative to conventional epoxy materials. Three samples were prepared comprising Araldite 6005 epoxy resin at a level of 75% by weight. Two of the samples (13A and 13B) comprised 15% by weight of a phosphate composition comprising 6.9% Nycor 200, 3.6% of prereacted acid solution as described in Example 1 and 4.5% of 85% $H_3PO_4$ having a $P_2O_5$ content of 61.5%. Sample 13A comprised 10% furfuryl alcohol resin (Durez No. 16470) whereas Sample 13B comprised 10% furfuryl alcohol. The third sample (13C) comprised only 25% polyamine/amide hardener (HY943).

The samples were prepared in the usual manner to provide cured products. The coefficient of thermal expansion was determined for each of these products essentially according to ASTM D386 using a duPont Model TMA940 thermo mechanical analyzer. The coefficient of thermal expansion (alpha) was determined at −30° C. and +30° C. for each sample. The results were as follows:

| Sample | Alpha + $10^{-6}$ inch/inch/°C. | |
| --- | --- | --- |
| | −30° C. | +30° C. |
| 13A | 47 | 56 |
| 13B | 48 | 59 |
| 13C | 60 | 70 |

These results indicate that the inclusion of the phosphate material in the epoxy matrix restricts the ability of the material to expand thermally, thus leading to lower values of the coefficient of expansion.

EXAMPLE 14

This example will illustrate that the preparation of a composition of the present invention comprising a conductive material. The sample was prepared from the following components:

| Components | Parts by Weight |
| --- | --- |
| Epoxy resin (No. 6005) | 75.0 |
| Furfuryl alcohol | 10.0 |
| Boron trifluoride.monoethylamine | 2.0 |
| Surfactant (Air Products S104A) | 0.5 |
| Carbon (Columbia 975) | 18.0 |
| Wollastonite (Nycor 200) | 6.9 |
| Prereacted acid solution | 3.5 |
| 85% $H_3PO_4$ (61.5% $P_2O_5$) | 4.7 |

The first five components were blended thoroughly and then intermixed with the last three components. The mixture was formed into a disc shape having a diameter of about 4 inches and a thickness of about ¼ inch. A hard-set sample was obtained in about 2 hours.

The electrical surface resistivity ($S_R$) was measured essentially according to ASTM D257 using an "IKE" probe supplied by Electrotech Systems, Inc. A value of $1.2 \times 10^5$ ohms per square was recorded.

The present invention is not restricted solely to the descriptions and illustrations provided above but encompasses all modifications and envisaged by the following claims.

What is claimed is:

1. A curable material comprising
an epoxy resin, and
a composition which is suitable to provide a rigid, water-resistant phosphate ceramic material, said composition comprising phosphoric acid, a metal oxide and calcium silicate.

2. The curable material as set forth in claim 1 hereof wherein said material comprises for every 100 parts by weight of said resin and phosphate composition from about 5 to about 95 parts of said resin and from about 95 to about 5 parts of said phosphate composition.

3. The curable material as set forth in claim 2 hereof comprising from about 50 to about 95 parts of said resin and from about 50 to about 5 parts of said phosphate composition.

4. The curable material as set forth in claim 3 hereof wherein said composition comprises a metal oxide selected from the group consisting of aluminum oxide, magnesium oxide, calcium oxide and zinc oxide.

5. The curable material as set forth in claim 3 hereof wherein said composition comprises an organic acid to facilitate the epoxy cure.

6. The curable material as set forth in claim 3 hereof wherein said composition comprises a masked Lewis Acid catalyst.

7. The curable material as set forth in claim 6 hereof wherein said masked catalyst is a boron trifluoride derivative.

8. The curable material as set forth in claim 7 hereof wherein said catalyst is boron trifluoride monoethylamine, said catalyst being present at a level of from about 0.5 to about 3% by weight.

9. The curable material as set forth in claim 3 hereof wherein said composition comprises a viscosity reducing agent.

10. The curable material as set forth in claim 9 hereof wherein said agent is furfuryl alcohol or a derivative thereof.

11. The curable material as set forth in claim 3 hereof wherein said composition comprises fillers.

12. The curable material as set forth in claim 3 hereof wherein said epoxy resins are liquid epoxy resins.

13. A process for preparing a curable composition, said process comprising the steps of
selecting an epoxy resin and components suitable to provide a rigid, water-resistant phosphate ceramic material, said components comprising phosphoric acid, a metal oxide and calcium silicate; and intermixing said resin and said components to provide a substantially uniform curable composition.

14. The process as set forth in claim 13 hereof comprising from about 5 to about 95 parts of said resin and from about 95 to about 5 parts of said components based on 100 total parts of said resin and said components.

15. The process as set forth in claim 14 hereof comprising from about 50 to about 95 parts of said resin and from about 50 to about 5 parts of said components.

16. The process as set forth in claim 15 hereof wherein said components comprise a metal oxide selected from the group consisting of aluminum oxide, magnesium oxide, calcium oxide and zinc oxide.

17. The process as set forth in claim 15 hereof wherein said curable composition comprises an organic acid to facilitate the epoxy cure.

18. The process as set forth in claim 15 hereof wherein said curable composition comprises a masked Lewis Acid catalyst.

19. The process as set forth in claim 18 hereof wherein said masked catalyst is a boron trifluoride derivative.

20. The process as set forth in claim 19 hereof wherein said catalyst is boron trifluoride monoethylamine, said catalyst being present at a level of from about 0.5 to about 3% by weight.

21. The process as set forth in claim 15 hereof wherein said curable composition comprises a viscosity reducing agent.

22. The process as set forth in claim 21 hereof wherein said agent is furfuryl alcohol or a derivative thereof.

23. The composition as set forth in claim 15 hereof wherein said curable composition comprises fillers.

24. The process as set forth in claim 15 hereof wherein said epoxy resins are liquid epoxy resins.

25. A process for preparing a coated substrate, said process comprising the steps of
selecting an epoxy resin and components suitable to provide a rigid, water-resistant phosphate ceramic material, said components comprising phosphoric acid, a metal oxide and calcium silicate;
intermixing said resin and said components to provide a substantially uniform coating composition;
disposing said composition on a substrate to be coated;
permitting said composition to self-cure on said substrate; and
optionally, applying a post-cure heat treatment to completely cure said composition.

26. The process as set forth in claim 25 hereof comprising from about 5 to about 95 parts of said resin and from about 95 to about 5 parts of said components based on 100 total parts of said resin and said components.

27. The process as set forth in claim 26 hereof comprising from about 50 to about 95 parts of said resin and from about 50 to about 5 parts of said components.

28. The process as set forth in claim 27 hereof wherein said coating composition comprises a metal oxide selected from the group consisting of aluminum oxide, magnesium oxide, calcium oxide and zinc oxide.

29. The process as set forth in claim 27 hereof wherein said coating composition comprises an organic acid to faciliate the epoxy cure.
set forth in claim 27

30. The process as set forth in claim 27 hereof wherein said coating composition comprises a masked Lewis Acid catalyst.

31. The process as set forth in claim 30 hereof wherein said masked catalyst is a boron trifluoride derivative.

32. The process as set forth in claim 31 hereof wherein said catalyst is boron trifluoride monoethylamine, said catalyst being present at a level of from about 0.5 to about 3% by weight.

33. The process as set forth in claim 27 hereof wherein said coating composition comprises a viscosity reducing agent.

34. The process as set forth in claim 33 hereof wherein said agent is furfuryl alcohol or a derivative thereof.

35. The process as set forth in claim 27 hereof wherein coating composition comprises fillers.

36. The process as set forth in claim 27 hereof wherein said epoxy resins are liquid epoxy resins.

* * * * *